US012677796B1

(12) United States Patent
Greenfield et al.

(10) Patent No.: US 12,677,796 B1
(45) Date of Patent: Jul. 14, 2026

(54) PORTABLE PET BED

(71) Applicant: Green Trek LLC, Merrick, NY (US)

(72) Inventors: Michael Greenfield, Merrick, NY (US); Edward C. Meagher, Southlake, TX (US); John Kraljic, Riverhead, NY (US)

(73) Assignee: Green Trek LLC, Merrick, NY (US)

( * ) Notice: Subject to any disclaimer, the term of this patent is extended or adjusted under 35 U.S.C. 154(b) by 0 days.

(21) Appl. No.: 19/246,141

(22) Filed: Jun. 23, 2025

(51) Int. Cl.
| | |
|---|---|
| *A01K 1/03* | (2006.01) |
| *A01K 1/035* | (2006.01) |
| *A01K 5/01* | (2006.01) |

(52) U.S. Cl.
CPC .......... *A01K 1/0353* (2013.01); *A01K 5/0114* (2013.01)

(58) Field of Classification Search
CPC .... A01K 1/0353; A01K 5/0114; A01K 1/035; A01K 1/0356; B65D 29/00; B65D 37/00; B65D 29/04; A45C 7/0077; A45C 7/0068; A45C 7/0063; A45C 7/0095
See application file for complete search history.

(56) References Cited

U.S. PATENT DOCUMENTS

| | | | | | |
|---|---|---|---|---|---|
| D89,646 | S | * | 4/1933 | Larson | D30/118 |
| 3,901,360 | A | * | 8/1975 | Cook | A45C 13/002 |
| | | | | | 190/125 |
| 4,790,592 | A | * | 12/1988 | Busso | B60N 2/6027 |
| | | | | | 297/229 |

| | | | | | |
|---|---|---|---|---|---|
| 5,172,795 | A | * | 12/1992 | Riceman | A45C 13/002 |
| | | | | | 150/105 |
| 5,211,130 | A | * | 5/1993 | Elias | A01K 1/0353 |
| | | | | | 119/28.5 |
| 5,544,792 | A | * | 8/1996 | Arnwine | A45C 7/0086 |
| | | | | | 224/652 |
| 5,573,288 | A | * | 11/1996 | Raffensperger | A47C 7/021 |
| | | | | | 297/188.1 |
| 5,671,698 | A | * | 9/1997 | Farrugia | A01K 1/0254 |
| | | | | | 119/497 |
| 5,785,219 | A | * | 7/1998 | Kraft | A47G 9/066 |
| | | | | | 224/901.2 |
| 6,141,805 | A | * | 11/2000 | Fisher-Cohen | A47D 15/003 |
| | | | | | 5/413 R |
| 6,283,260 | B1 | * | 9/2001 | Yasuda, Sr. | A45C 3/12 |
| | | | | | 190/110 |
| 6,907,842 | B2 | * | 6/2005 | Godshaw | A01K 1/0353 |
| | | | | | 119/28.5 |

(Continued)

FOREIGN PATENT DOCUMENTS

| | | | | |
|---|---|---|---|---|
| WO | WO-02086753 | A1 | * 10/2002 | A01K 27/009 |
| WO | WO-2014171881 | A1 | * 10/2014 | A01K 5/0135 |

*Primary Examiner* — Ebony E Evans
(74) *Attorney, Agent, or Firm* — Carter, DeLuca & Farrell LLP

(57) ABSTRACT

A transportable pet bed includes a top portion and a bottom portion. A pillow is moveable relative to the top portion to expose a sleeping region for a pet, the pillow positionable relative to the top portion to expand the sleeping region. One or more pockets is defined within the top portion or the bottom portion, one or more pockets configured to house a protective cover, the protective cover configured to enwrap the pet bed for transportation. A carrying strap is operably coupled to the top portion or the bottom portion and is configured to facilitate carrying the pet bed.

15 Claims, 12 Drawing Sheets

(56) References Cited

U.S. PATENT DOCUMENTS

| 7,077,251 | B1 * | 7/2006 | Gaither | A45C 13/002 |
| | | | | 150/105 |
| 7,690,725 | B1 * | 4/2010 | Rawlings | A47C 31/11 |
| | | | | 297/229 |
| 10,010,198 | B2 * | 7/2018 | Dubois | A47G 9/086 |
| 11,234,411 | B2 * | 2/2022 | Becker | A01K 1/0353 |
| 11,246,433 | B2 * | 2/2022 | Luker | B65H 75/486 |
| 12,029,196 | B1 * | 7/2024 | Chung | A01K 1/0353 |
| 12,336,499 | B1 * | 6/2025 | Phan | A01K 1/0353 |
| 2005/0211175 | A1 * | 9/2005 | Johnson | A01K 1/0353 |
| | | | | 119/28.5 |
| 2006/0288953 | A1 * | 12/2006 | Bottorff | A01K 13/00 |
| | | | | 119/497 |
| 2007/0125312 | A1 * | 6/2007 | Boyd | A01K 1/0353 |
| | | | | 119/721 |
| 2008/0173627 | A1 * | 7/2008 | Martin | A01K 1/0353 |
| | | | | 119/28.5 |
| 2012/0263331 | A1 * | 10/2012 | Newman | A01K 1/0353 |
| | | | | 381/333 |
| 2013/0220236 | A1 * | 8/2013 | Wisdom | A01K 1/035 |
| | | | | 119/719 |
| 2016/0205892 | A1 * | 7/2016 | Hills | A01K 1/0353 |
| 2019/0022262 | A1 * | 1/2019 | Andrews | A45C 15/00 |
| 2021/0227787 | A1 * | 7/2021 | Friedgood | A45C 13/02 |
| 2023/0103094 | A1 * | 3/2023 | Chon | A01K 1/0353 |
| | | | | 119/28.5 |

* cited by examiner

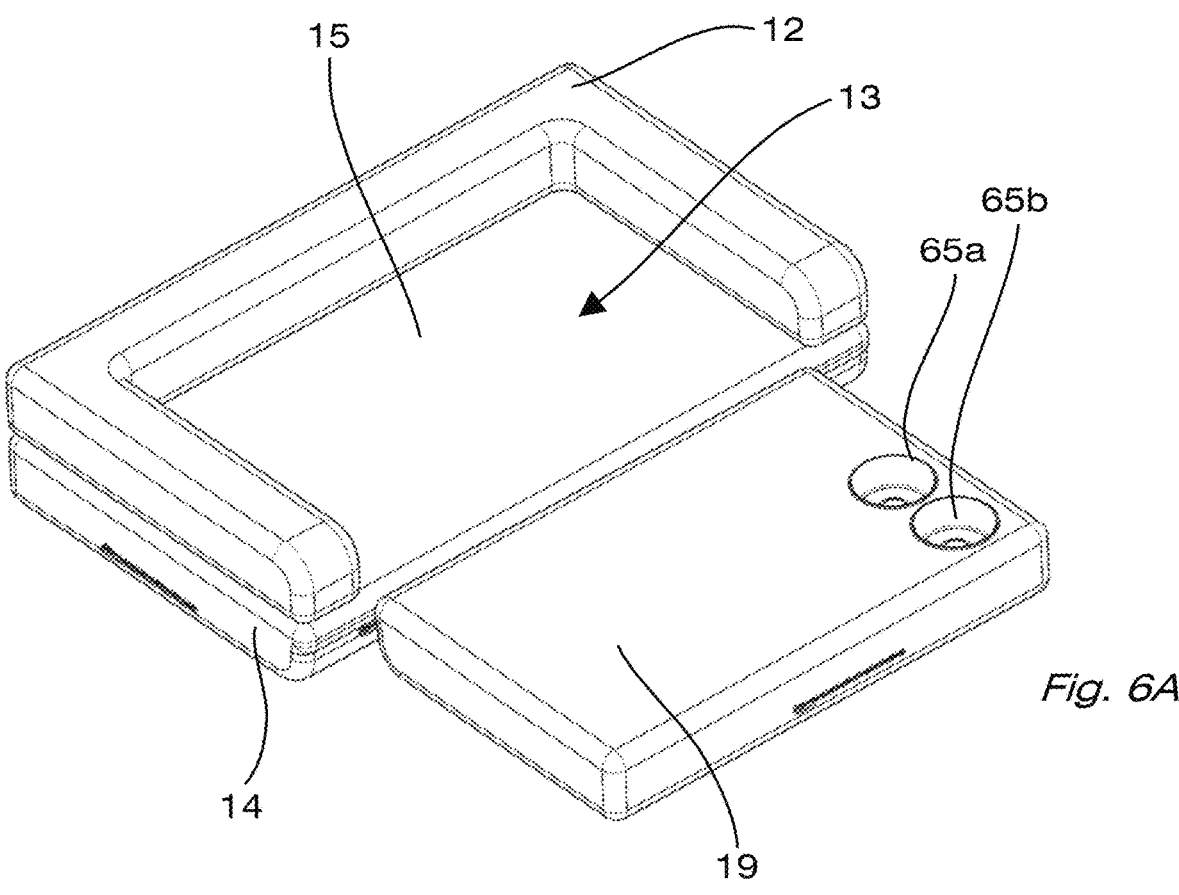
*Fig. 6A*
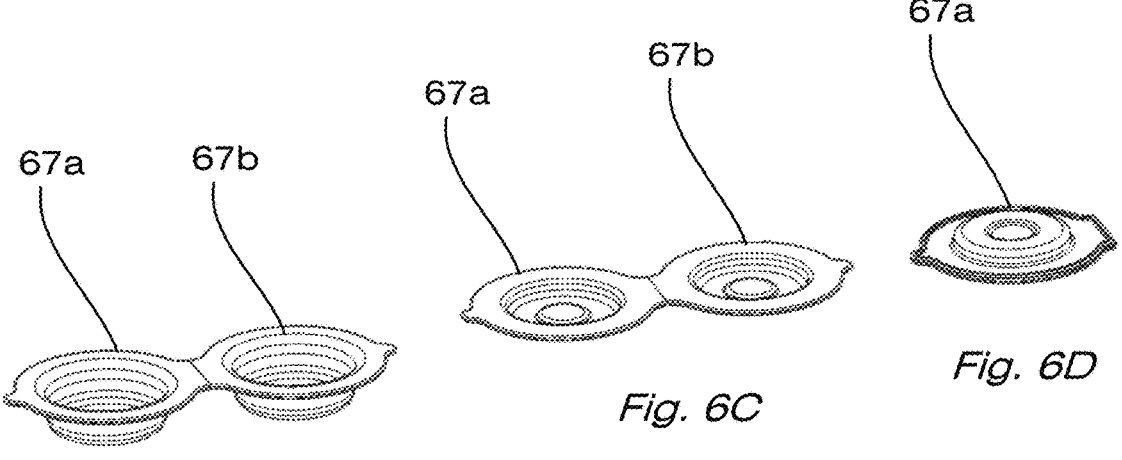
*Fig. 6B*
*Fig. 6C*
*Fig. 6D*

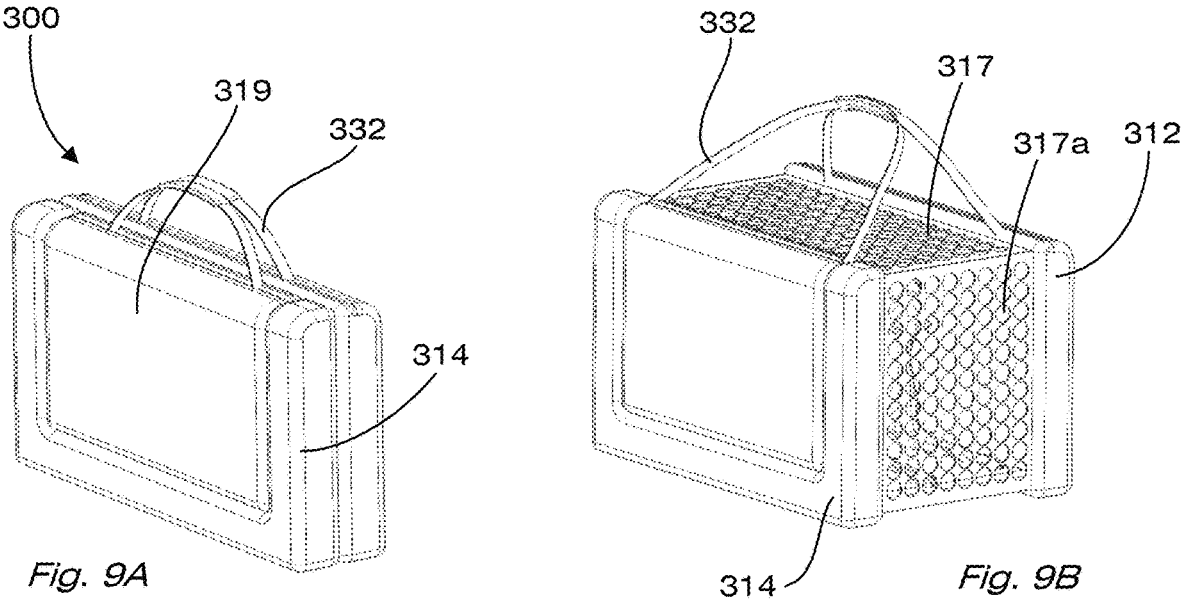
*Fig. 9A*
*Fig. 9B*
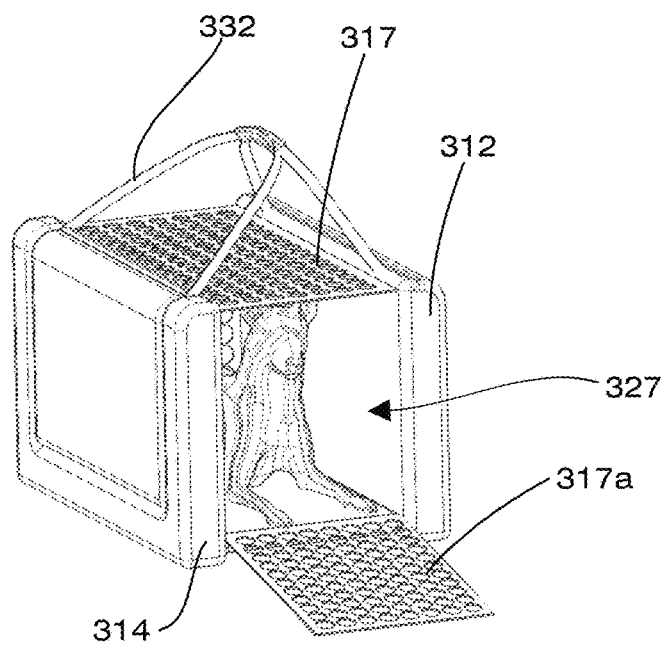
*Fig. 9C*

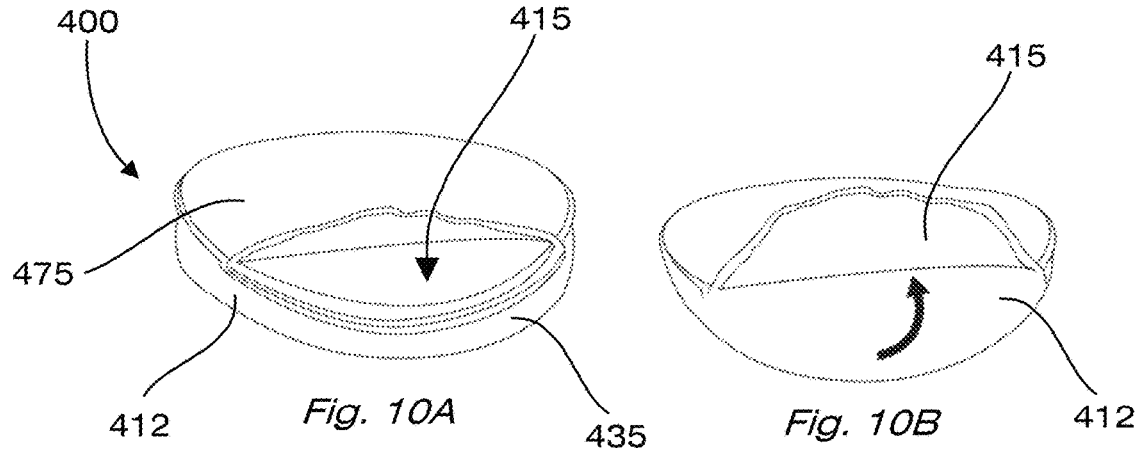
*Fig. 10A*
*Fig. 10B*
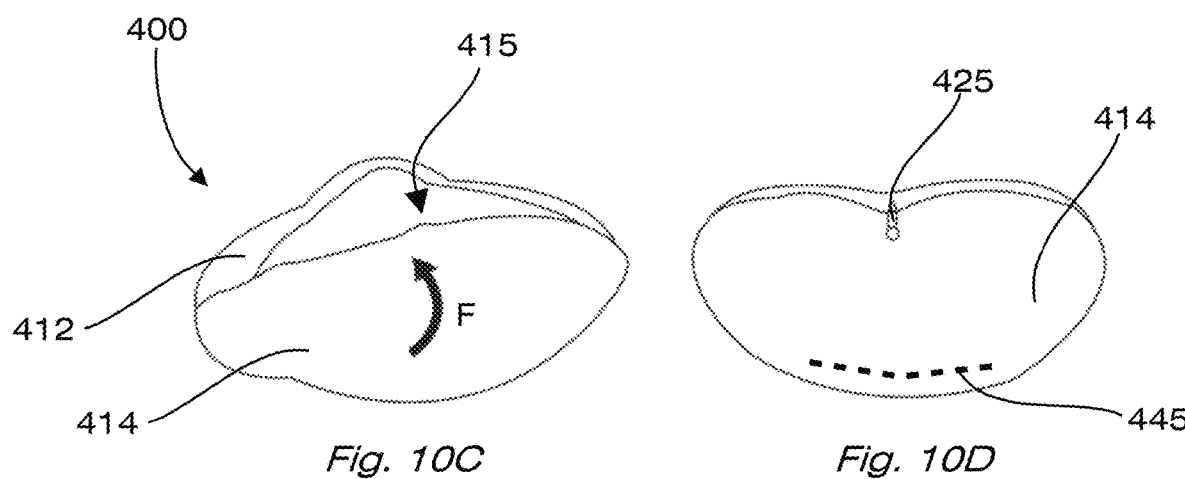
*Fig. 10C*
*Fig. 10D*
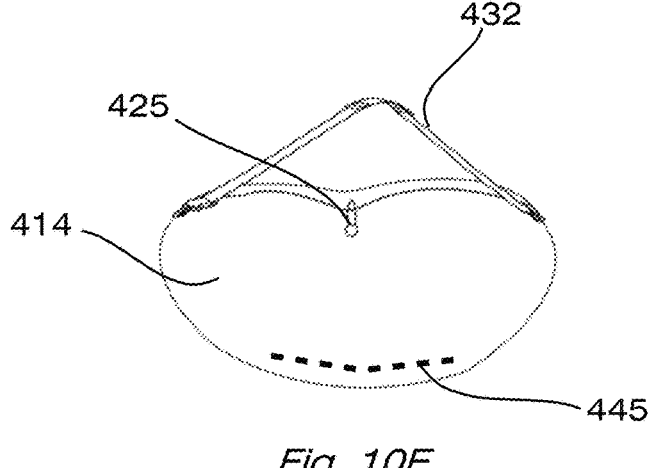
*Fig. 10E*

500

535'

535

650

650

PORTABLE PET BED

FIELD

The present disclosure is generally directed to pet beds and, in particular, portable pet beds that may be safely and conveniently transported when traveling or for easy and convenient storage when not in use.

BACKGROUND

Pet beds typically take the form of large rectilinear structures that are often bulky and difficult to store when not in use especially for medium to larger pets such as dogs. Moreover, the beds are often made from pillowcase-like fabrics or wool and filled with materials that are uncomfortable and which tend to lump together. Such beds are also not easily transportable, as they are not compact, are typically shaped in odd ways, e.g., rectilinear, and do not include features such that a pet owner can easily manipulate the beds for transport, e.g., handles, closure mechanisms, etc. Some known pet beds that are foldable simply do not provide the necessary convenience to make them practicable for use when traveling or are uncomfortable for pets.

Other pet beds do not contain or have the ability to contain modern day conveniences that certain pet owners may opt to include in their pet's beds especially when traveling for safety, health, or comfort concerns. Thus, there exists a need for a comfortable pet bed that is easily transportable, compact, and provides pet owners with additional conveniences to make pet travel easier.

SUMMARY

Provided in accordance with the present disclosure is a transportable pet bed which includes a top portion and a bottom portion and a pillow moveable relative to the top portion to expose a sleeping region for a pet. The pillow is positionable relative to the top portion to expand the sleeping region. One or more pockets is defined within the top portion or the bottom portion, the one or more pockets configured to house a protective cover, the protective cover configured to enwrap the pet bed for transportation. A carrying strap is operably coupled to the top portion or the bottom portion and is configured to facilitate carrying the pet bed.

In aspects in accordance with the present disclosure, the one or more pockets is configured to house one or more pet accessories for transportation.

In aspects in accordance with the present disclosure, the one or more pockets is configured to house one or more modular components, the one or more modular components adapted to connect to a power or data source. In other aspects in accordance with the present disclosure, the one or more modular components include: a pet health monitor, a pet safety monitor, a warming pad, a cooling pad, a vibration pad, a music player, an alarm system, a fencing system, a feeding system, a leak detection system and/or a barking control system.

In aspects in accordance with the present disclosure, the one or more modular components is configured to operably couple to an electrical accessory hub disposed within the top portion or the bottom portion, the electrical accessory hub including a universal interface for operably coupling a plurality of modular components.

In aspects in accordance with the present disclosure, the pet bed includes two or more pockets for housing two or more modular components, the two or more modular components configured to communicate with one another.

In aspects in accordance with the present disclosure, the protective cover is integral with one of the top or bottom portions.

In aspects in accordance with the present disclosure, the protective cover is selectively deployable from the one or more pockets.

In aspects in accordance with the present disclosure, the protective cover is stored within the one or more pockets under a spring bias to facilitate deployment thereof.

In aspects in accordance with the present disclosure, the one or more modular components is adapted to connect to a mobile device.

In aspects in accordance with the present disclosure, the carrying strap is disposed within one of the top portion or the bottom portion and is selectively removeable therefrom.

In aspects in accordance with the present disclosure, the carrying strap is selectively removeable from the top portion or the bottom portion and the carrying strap is selectively convertible into a leash for securing a pet.

Provided in accordance with the present disclosure is a transportable pet bed which includes a top portion and a bottom portion and a pillow moveable relative to the top portion to expose a sleeping region for a pet. The pillow is positionable relative to the top portion to expand the sleeping region. One or more pockets is defined within the top portion or the bottom portion, the one or more pockets configured to house a protective cover, the protective cover configured to enwrap the pet bed for transportation. An integrated food or water holder is defined within one of the top portion and/or the bottom portion.

In aspects in accordance with the present disclosure, the pet bed further comprises an insert configured to operably couple to the integrated food or water holder. In other aspects in accordance with the present disclosure, the insert is disposable. In yet other aspects in accordance with the present disclosure, the insert is reusable and configured to collapse, fold, or contract for storage within the one or more pockets.

In aspects in accordance with the present disclosure, the food or water holder is made from a material that is washable.

Provided in accordance with the present disclosure is a method of transporting a pet bed which includes: deploying a protective cover from one of a top portion or a bottom portion of a pet bed; enwrapping and securing the pet bed within the protective cover; and releasing the pet bed to a commercial transport service for transport.

In aspects in accordance with the present disclosure, prior to releasing the pet bed, the method further includes: deploying a carrying strap from a pocket defined within one of the top portion or the bottom portion of the pet bed to facilitate handling the pet bed prior to transport; and storing the carrying strap within the pocket prior to releasing the pet bed to the commercial transport service.

In aspects in accordance with the present disclosure, the method further includes: tracking the pet bed via a mobile device adapted to communicate with one or more modular components disposed with a pocket defined within the pet bed.

BRIEF DESCRIPTION OF THE DRAWINGS

In the drawings, where like numerals refer to like components throughout several views:

FIGS. 6A-6D are various views of the pet bed having integrated food and water holders which include removable inserts in accordance with the present disclosure;

FIGS. 9A-9C are various views of the pet bed that is selectively expandable for transporting a pet in accordance with the present disclosure;

FIGS. 10A-10E are various views of the pet bed having an integrated or removeable blanket that can be extended over the pet bed and secured for transport in accordance with the present disclosure;

DETAILED DESCRIPTION

Figures 1A, 1B:
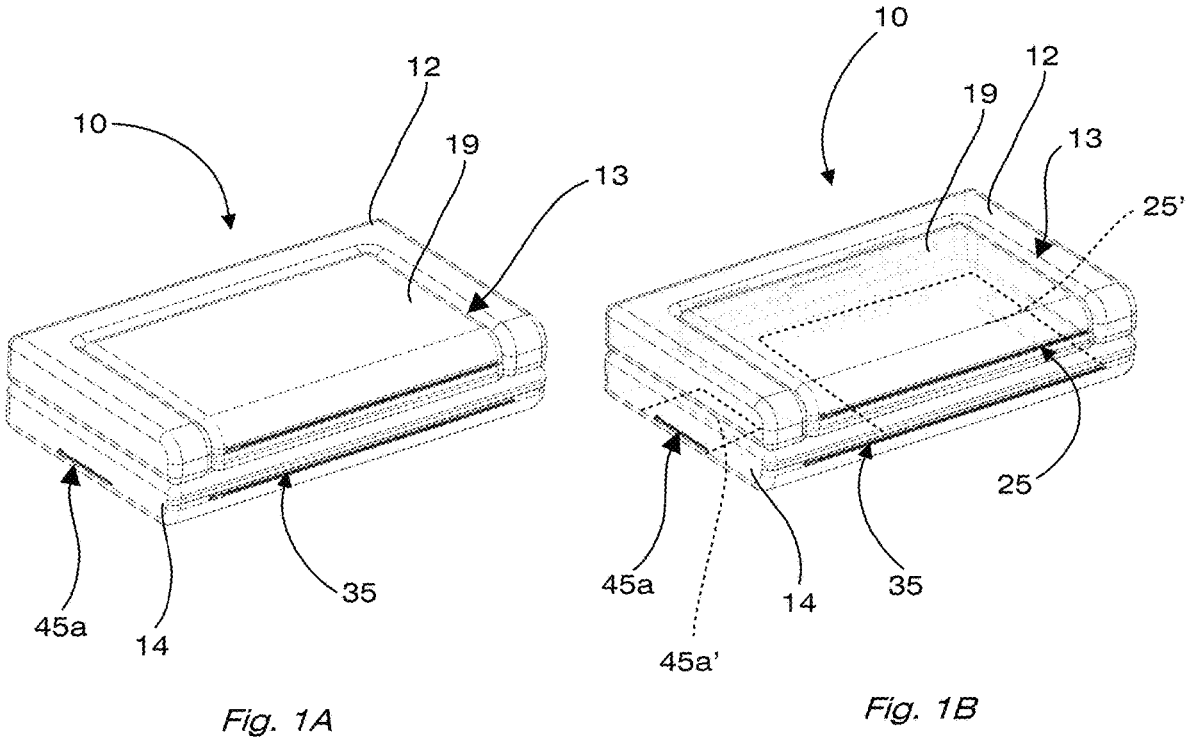
FIGS. 1A-1D are various views of a pet bed according to one embodiment of the present disclosure.

FIGS. 1A-1D illustrate one embodiment of a portable ped bed for traveling with pets and is generally designated ped bed 10. As shown, pet bed 10 is generally rectilinear in shape and includes a top bed portion 12 and a lower bed portion 14. Top bed portion 12 or a portion thereof, e.g., sleep pillow 19, is configured to move relative to the top portion 12 and/or is configured to move relative to the bottom portion 14 to deploy the pet bed for use. In embodiment, the entire top portion 12 or the entire bottom portion 14 may be moveable relative to one another to deploy the bed 10 for use, i.e., extend the bed 10 for sleeping or comfort purposes. Both the top portion 12 of the bed 10 and the bottom portion 14 of the bed 10 may be configured to include one or more pockets defined therein, the purpose of which being explained in more detail below.

For example, the bottom portion may include one or more openings, e.g., opening 45a, 45b, and 45c, defined therethrough that define corresponding pockets 45a', 45b', and 45c' which are configured to house various pet accessories, e.g., pet toys, pet wipes, pet food, urination pads, etc. A closure mechanism may be utilized to keep the pockets 45 secured during transport or when not in use, e.g., a zipper. Access to the various pockets may depend on the deployment position of the pet bed 10.

Figure 1C:
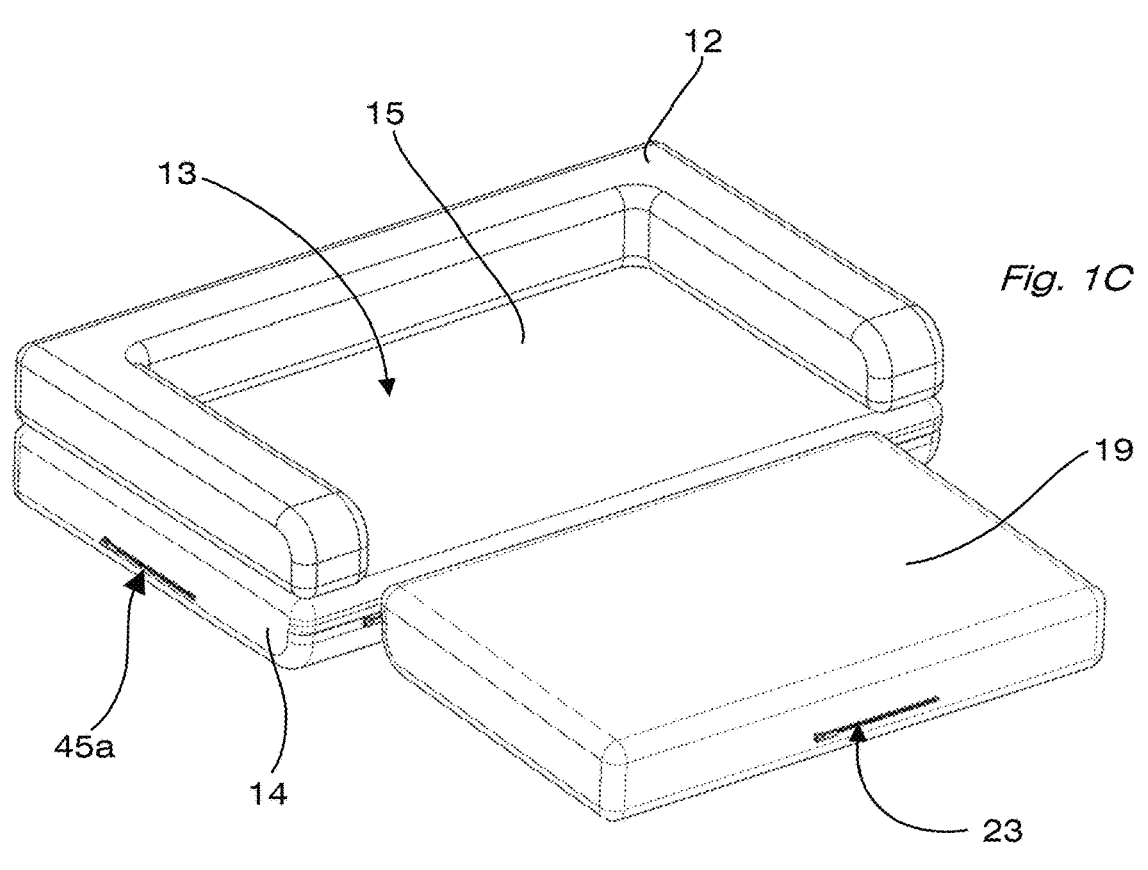
Figure 1D:
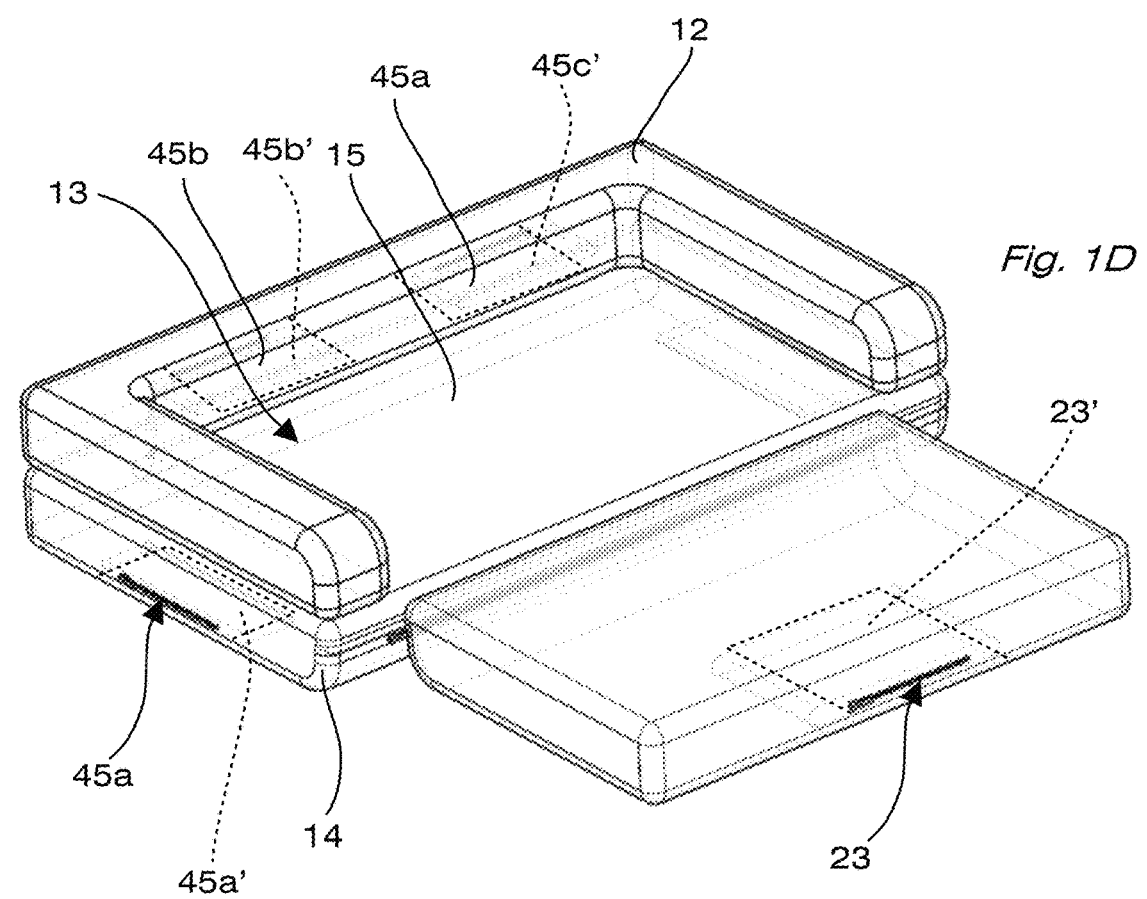

As best shown in FIGS. 1C and 1D, when pillow 19 is deployed, the pet bed 10 is extended for pet comfort for sleeping purposes. Pillow 19 may be attached or selectively attachable to secure the pillow 19 to the main top 12 and bottom portions 14. Once pillow 19 is deployed, a bottom sleeping region 13 is defined along the inner periphery of top portion 12 which includes a bottom pillow 15 for pet comfort. When pillow 19 is deployed, bottom pillow 15 and pillow 19 are coplanar (or flush relative to one another) for additional pet comfort. As mentioned above, one or more pockets may become exposed when the pet bed 10 is deployed, e.g., pocket 23' disposed within the pillow 19.

The pet bed may be made out of a soft plush material for pet comfort. For example, bottom sleeping region 13 and/or pillow 19 may be covered with, made from or filled with any type of material for providing pet comfort, e.g., plush, waterproof, egg foam, heat dispersion materials, gel or memory foam materials, sponge-like materials, etc. The top and/or bottom portion 12, 14 may also be made from or include any one of the above-identified materials or, in embodiments, may be made from or include a material that is thermally regulating either via a power source or self-thermally regulating, e.g., materials using technology such as HEIQ Smart Temp, Climarell, 37.5 Technology (Cocona), Graphene or bio-based materials which are a class of dynamic response materials configured to regulate or maintain the temperature of the pet bed 10 within a particular temperature range without a power source. Active cooling technologies are also envisioned, e.g., gel cooling, air cooling or cooling via a phase change material.

Figure 2:
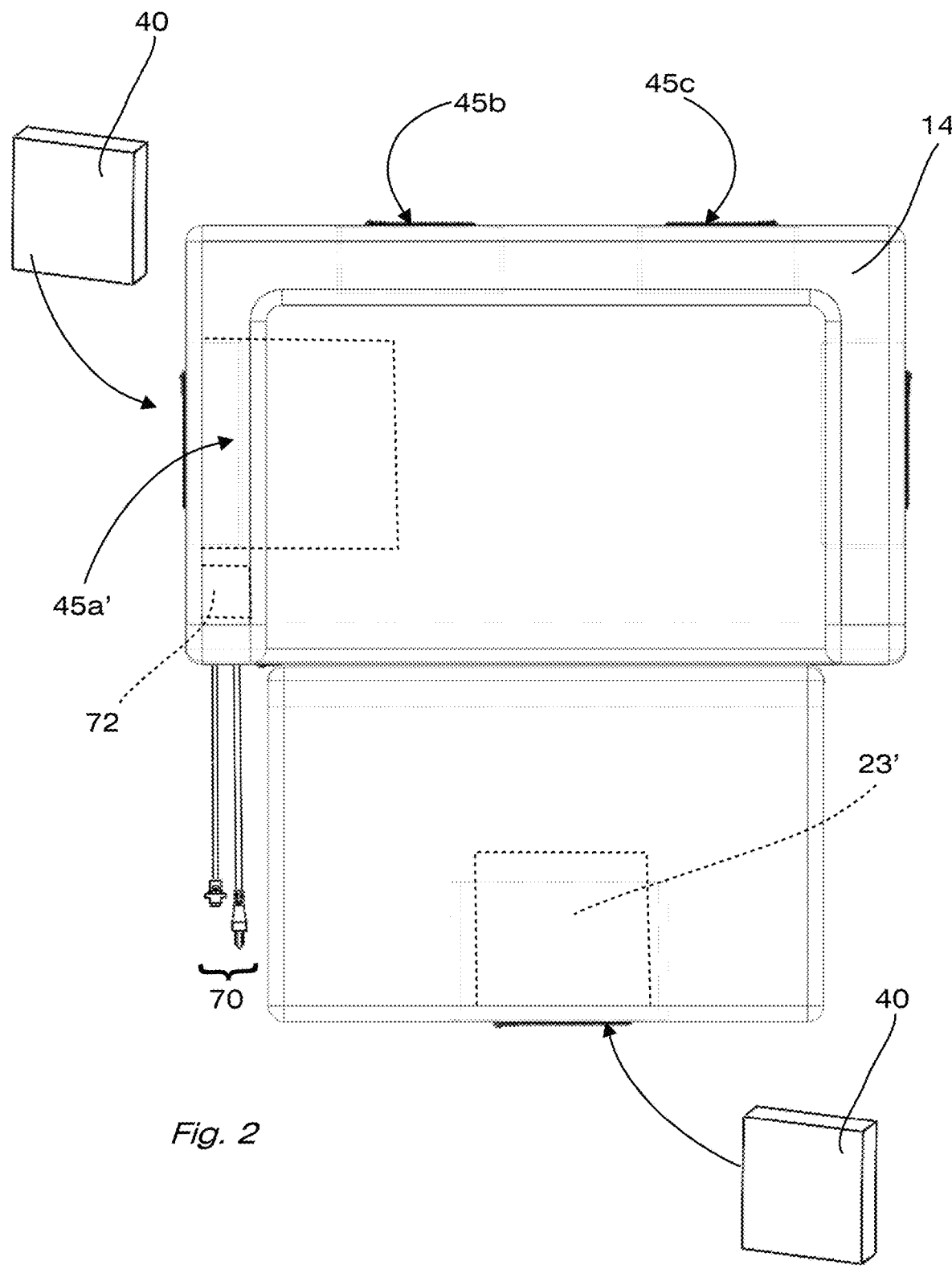
FIG. 2 is a top view of the pet bed of FIGS. 1A-1D showing a modular component for selective incorporation therein.

Turning now to FIG. 2, pet bed 10 may be configured to include one or more carrying straps 32 to facilitate transport of the pet bed when traveling. Carrying straps 32 may be exposed on the outer periphery of the top 12 or bottom 14 portions for ease of use or the straps 32 may be selectively stored within one or more of the pockets 45a'-45c'' or 23'. The straps 32 may be coiled within a pocket, e.g. pocket 45a', such that the strap 32 is easily deployable via the coil or spring, or the strap 32 may be folded or include a pull tab for easy access. As mentioned below, straps 32 may be converted into a leash 50 for the pet during handling and transport of the pet bed 10. This will free up one of a user's hands when traveling. The straps 32 may be attached to any side of portions 12, 14 with any known method of affixation, e.g., clips, snap-fit, spring-loaded hooks, etc. The straps 32 may be configured to selectively deploy from one of the pockets 45a'-45c' or 23 and may be integral with the top or bottom portion 12, 14.

FIG. 2 also illustrates the use of the pet bed 10 with one or more of a series of modular components that may be selectively utilized for various purposes. For example, a heating or cooling pad 40 may be configured to be received within one or more pockets 45a'-45c', or 23' defined within the pet bed 10. The heating or cooling pad 40 may be selectively inserted into one or more of the pockets 45a'-45c' or 23' to cool or warm the pet while sleeping. Conventional heating or cooling pads 40 may be employed or pads 40 that plug into an electrical accessory hub 72 (See also FIGS. 7A and 7B) as explained in more detail below. As explained in more detail below, the electrical accessory hub 72 may be utilized for a variety of different uses.

Figures 3A, 3B, 3C:
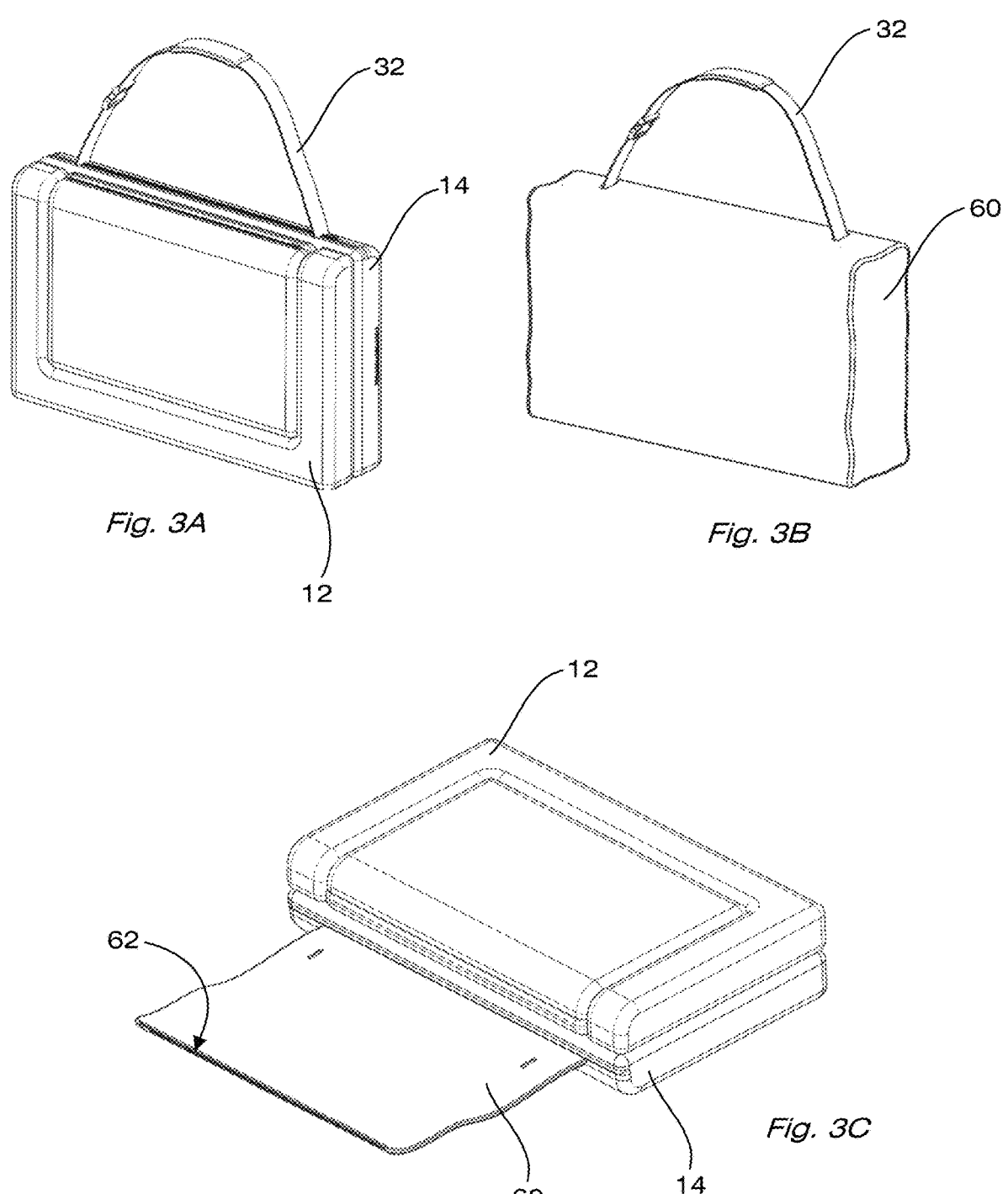
FIGS. 3A-3C are various views of another envisioned embodiment of the pet bed having a deployable protective cover in accordance with the present disclosure.

Turning briefly to FIGS. 3A-3B, during transport, especially when traveling via airports, trains, and buses, there is a tendency for the pet bed 10 to become soiled. Moreover, handling systems of airports, trains, and buses are not known for being careful sorting suitcases and luggage and the pet bed 10 may become susceptible to unnecessary wear and tear. As shown, the bottom portion 14 (or the top portion or any pocket defined therein) may be configured to hold a protective cover 60 that can be easily deployed to envelop and protect the pet bed 10 for transport purposes. The protective cover 60 may be made out of any durable material that easily enwraps the pet bed 10 for transport and protective purposes.

The protective cover 60 may be configured in the same shape as the pet bed 10, e.g., rectilinear, oval, kidney-shaped, circular, etc. The protective cover 60 may be configured to easily store within one of the pockets 45*a*'-45*c*' or 23' and may be easily washable or cleanable for repeated use. The protective cover 60 may be customized with the pet's name and other identifying indicia. Moreover, the protective cover 60 may be integrated within the pet bed 10 and self-deployable or deployable under a bias, e.g., spring-loaded similar to a window shade. Pull tabs may also be employed to deploy the protective cover 60.

Figure 4A:
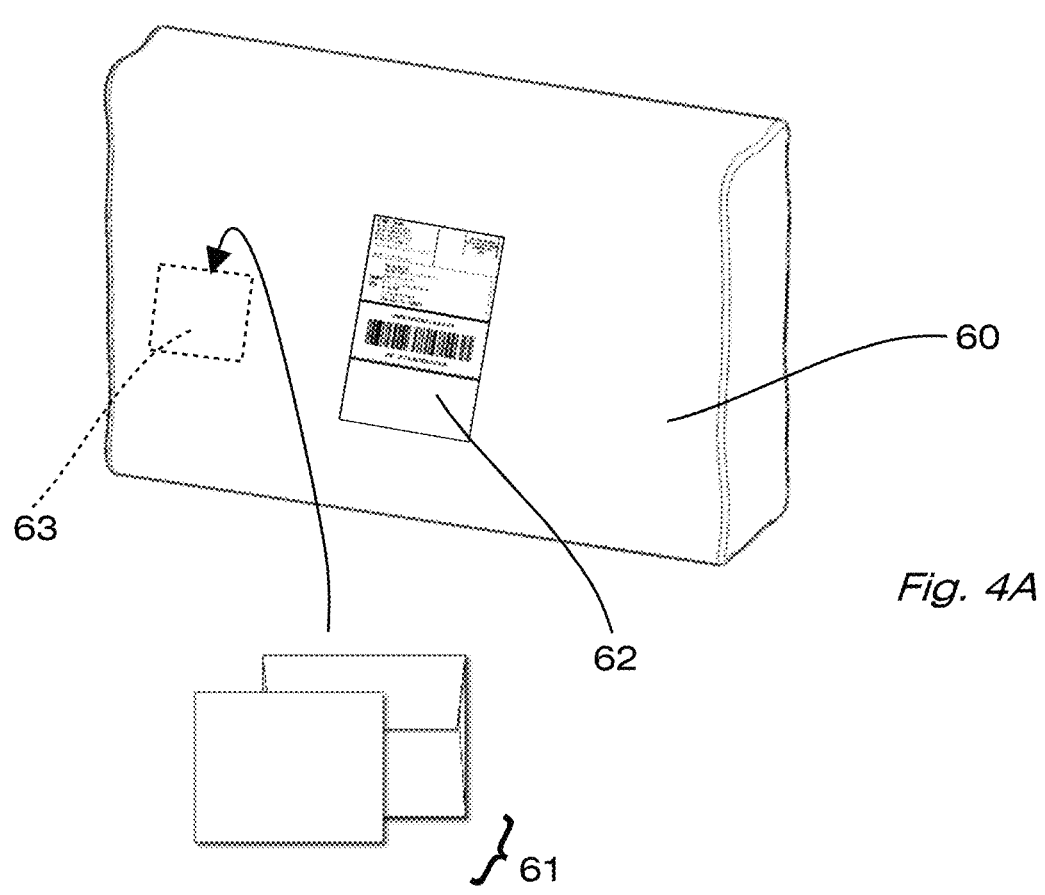
FIGS. 4A-4B are various views of the pet bed having the deployable protective cover which can be configured for mailing the pet bed in accordance with the present disclosure.
Figure 4B:
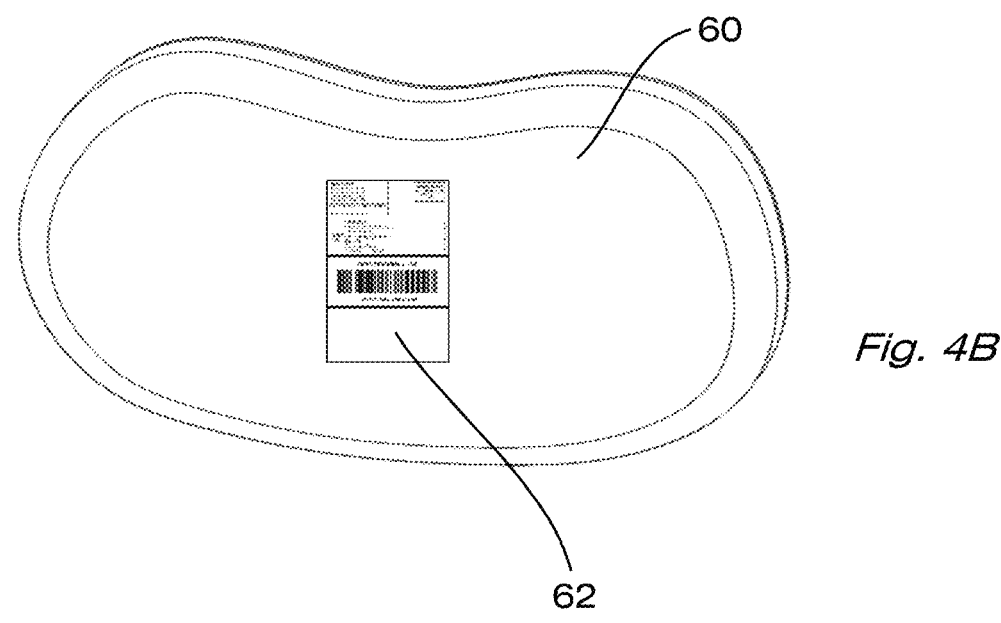

The protective cover 60 may also be used for mailing the pet bed 10 to a specific destination or for sending the pet bed 10 as a gift. A card pocket 63 may be defined on the inside of the protective cover 60 for housing a gift card 61 (See FIGS. 4A-4B). The protective cover 60 may be made out of a material to removably adhere a mailing label 62 for mailing purposes or for adhering a luggage tag for transport.

Figure 5A:
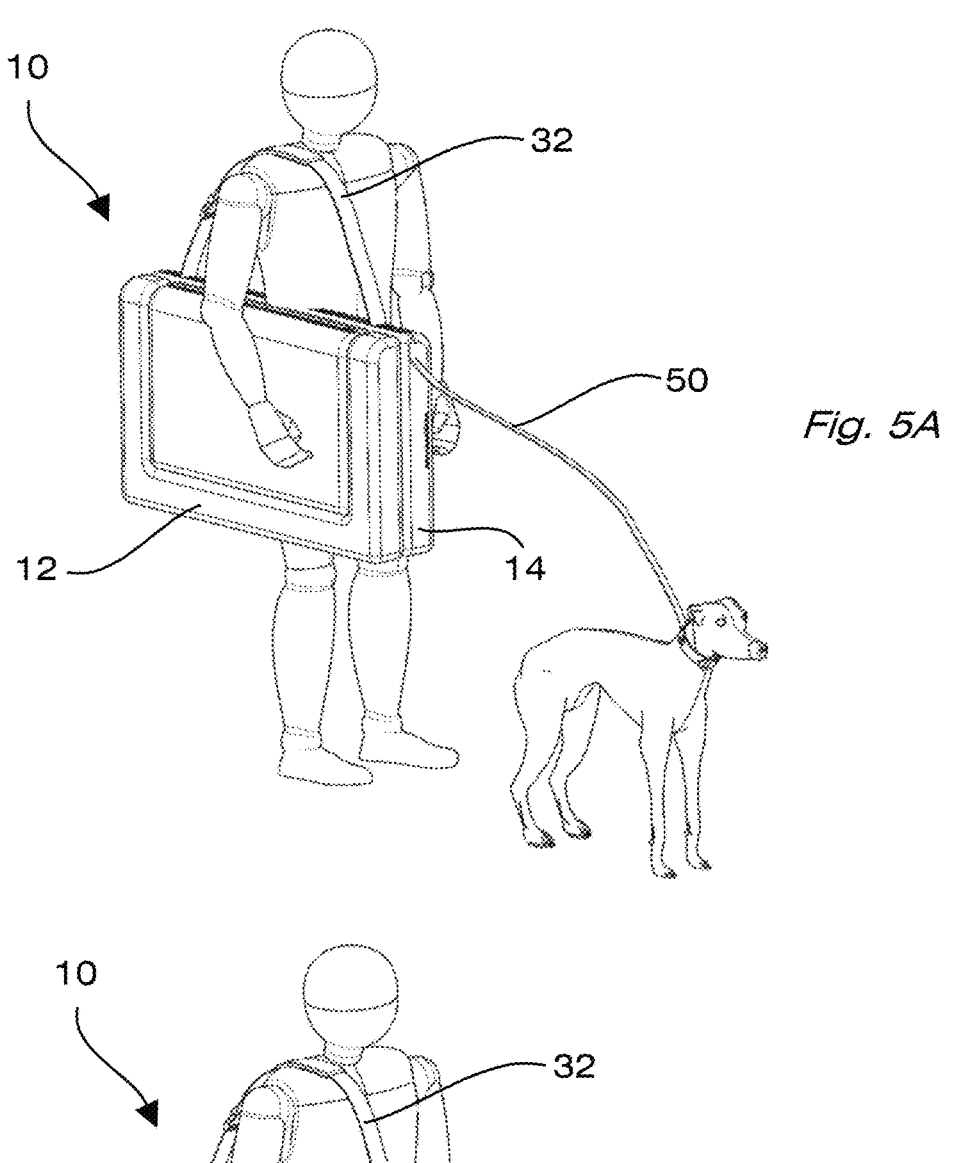
FIGS. 5A-5B are various views of the pet bed during transport having a deployable leash for securing a pet in accordance with the present disclosure.
Figure 5B:
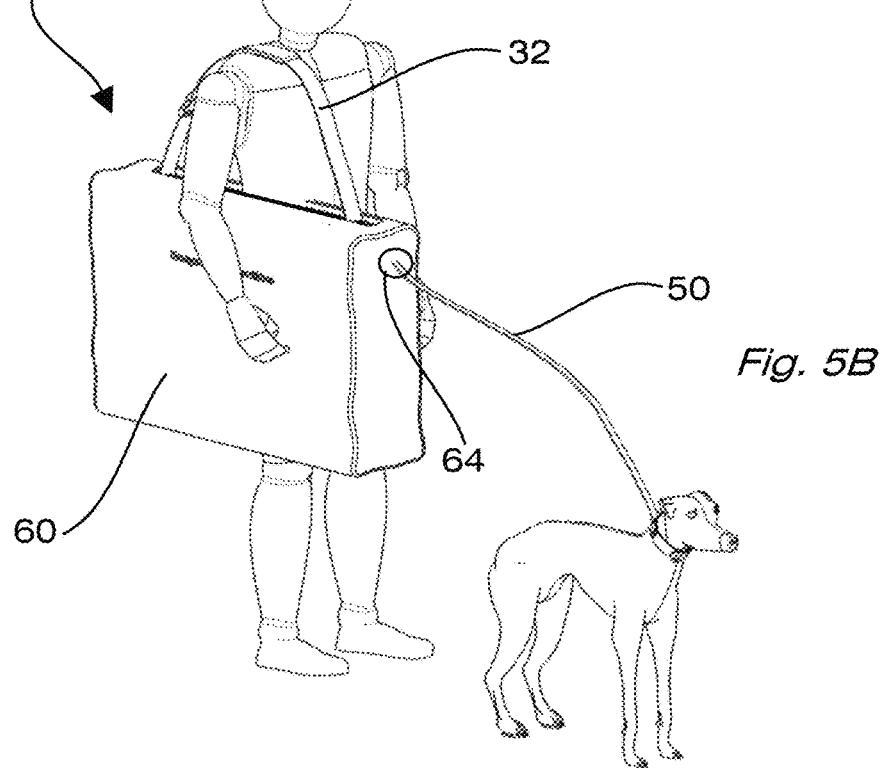

FIGS. 5A and 5B show the pet bed 10 in the transport configuration (FIG. 5A) or travel configuration (FIG. 5B). A leash 50 may be integrated within one of the pockets 45*a*'-45*c*' or 23' and may be selectively deployable when needed to secure the pet for transport and travel. Similar to the carrying strap 32, the leash 50 may be stored within the top or bottom portion 12, 14, respectively, such that the leash 50 is easily deployed when needed, e.g., coiled, spring-loaded, pull tab, etc. When used in the transport configuration, i.e., when the user is carrying the pet bed 10 between destinations, the leash 50 may be deployed and remain affixed to the top or bottom portion 12, 14, respectively, thereby freeing up the user's hands during transport. Likewise, the leash 50 may be deployable through a grommet 64 disposed through the protective cover 60. This enables the leash 50 to be deployed when the protective cover 60 envelops the pet bed 10 for traveling purposes.

Turning to FIGS. 6A-6D, the pet bed 10 may be configured to include integrally-formed food and water holders 65*a* and 65*b*, respectively. In embodiments, the food holder 65*a* and water holder 65*b* is formed in either to top portion or the deployable pillow 19. As such, the holders 65*a*, 65*b* become exposed when the pillow 19 is deployed for extending the pet bed 10. As shown, the holders 65*a*, 65*b* are disposed on an upper facing surface of the pillow 19 when deployed. In embodiments, the holders 65*a*, 65*b* may be disposed on an underside of the pillow 19 and exposed when the pillow 19 is flipped. The holders 65*a*, 65*b* may be made from a waterproof material which is easily cleanable after use. As can be appreciated, this eliminates the need for actual pet bowls for holding the food and water.

As best shown in FIGS. 6B-6D, the holders 65*a*, 65*b* may include reusable inserts 67*a* and 67*b* used to store food and water or selectively within the folders 65*a*, 65*b*. The inserts 67*a*, 67*b* may be made from a waterproof material, e.g., neoprene, which is also easily cleanable after use. In embodiments, the inserts 67*a*, 67*b* are collapsible (67*c*) or foldable (67*b*) for ease of transport and storage. The inserts 67*a*, 67*b* may be stored in any one of the pockets 45*a*'-45*c*' or 23 defined in the top or bottom portions 12, 14, respectively. The inserts 67*a*, 67*b* may be used separately apart from the holders 65*a*, 65*b* or may be integrated with the holders 65*a*, 65*b* and removable. In embodiments, the inserts 67*a*, 67*b* may be sold in multiple packs and disposable after use. The inserts 67*a*, 67*b* may be secured within the holders 65*a*, 65*b* via any form of attachment, e.g., a hook and loop fastening assembly commonly sold under the trademark Velcro® made from a high friction material to reduce slippage (Fluorobond™), tongue and groove, snap-fit, etc.

Figures 7A, 7B:
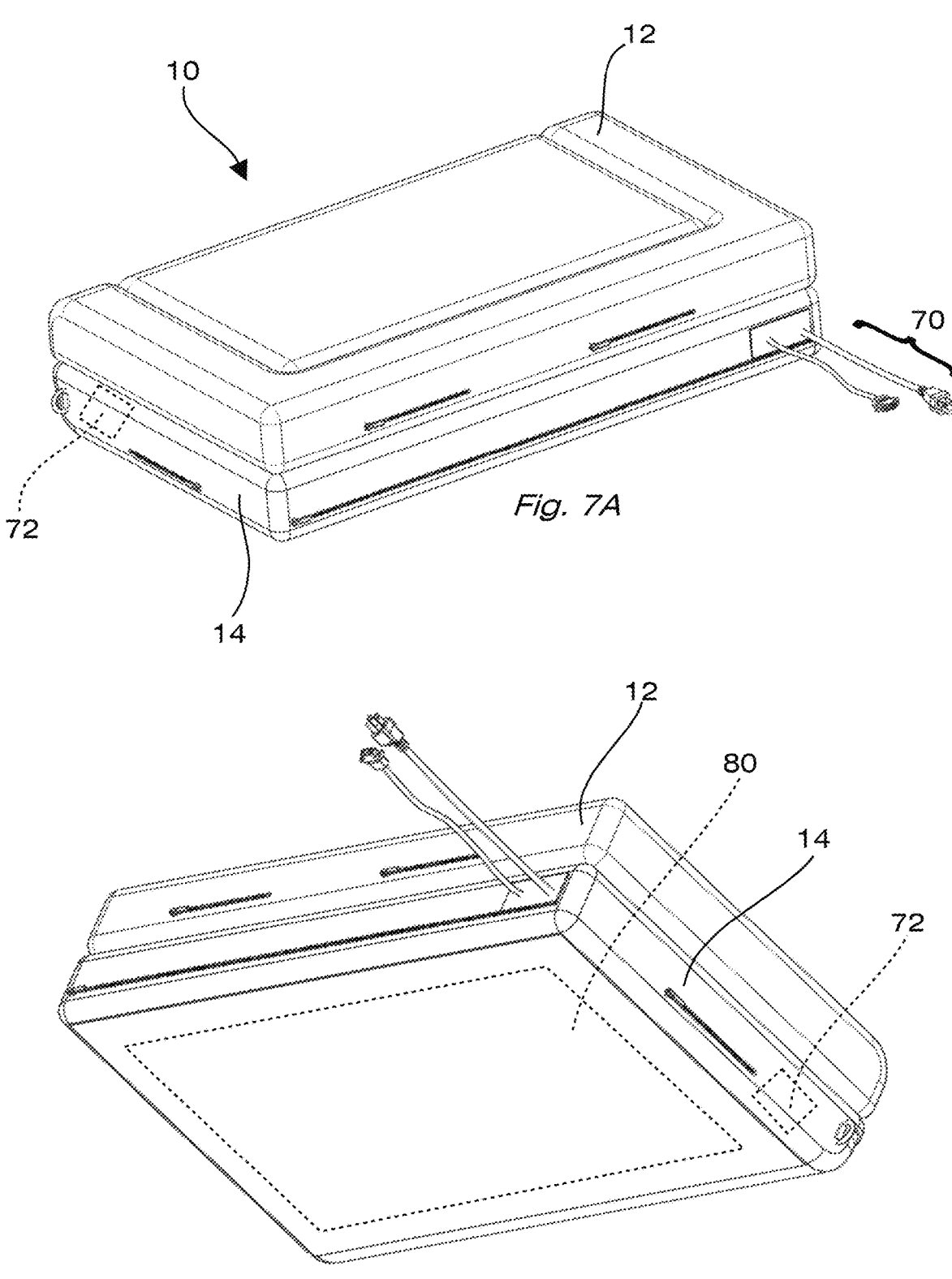
FIGS. 7A-7B are various views of the pet bed having a power and data cord which is selectively extendable therefrom.

As mentioned above, the pet bed 10 includes a selectively deployable power and data cord(s) 70 disposed in either the respective top or bottom portions, 12, 14 of the pet bed 10. Power and data cord(s) 70 may be disposed in a coiled or spring-loaded fashion within the top or bottom portions 12, 14, respectively, such that the power and data cord(s) is easily deployable. As best shown in FIGS. 7A and 7B, the power and data cord(s) 70 is selectively extendable from the pet bed 10 to operably couple to a power source or data source as needed. The power or data cord(s) 70 may also couple to an electrical accessory hub 72 which is selectively engageable with one or more modular components.

More particularly, electrical accessory hub 72 may be utilized to selectively couple with one or more components 80 that may be housed within one or more of the pockets 45*a*'-45*c*' or 23 or disposed adjacent to the pet bed 10. For example, the electrical accessory hub 72 may couple to a modular component 80 such as a warming pad that is disposed within one of the top or bottom portions 12, 14, respectively. The warming pad may be selectively rechargeable via the electrical accessory hub 72. Other modular components are also envisioned, pet monitoring systems for health and safety, fencing systems, feeding systems, leak detection, barking monitors, alarm systems, vibration pads, music or other noise systems, etc. These modular components 80 may be selective integratable with the pet bed 10 in any fashion and connected to a common electrical accessory hub 72 or multiple electrical accessory hub 72 having a universal interface. Two or more modular components may be configured to network with one another or communicate with one another depending on a particular purpose.

The modular components 80 may be wirelessly (Bluetooth®) connected to a smart watch, mobile phone or computer for viewing and monitoring purposes, programming purposes, record keeping purposes, etc. For example, a vibration pad may be selectively integrated within the bottom portion 14 of the ped bed 10 and synchronized with the owner's alarm clock such that the pet and the owner wake at the same time. The modular component 80 may also be utilized as a training tool. In other embodiments, the modular component 80 may be programmed to monitor a pet's sleeping habits or vital signs or determine if the pet is wandering around at night or having trouble sleeping. The modular component 80 may also be utilized for tracking purposes during transport of the pet bed 10 utilizing a commercial transport service.

Figure 8A:
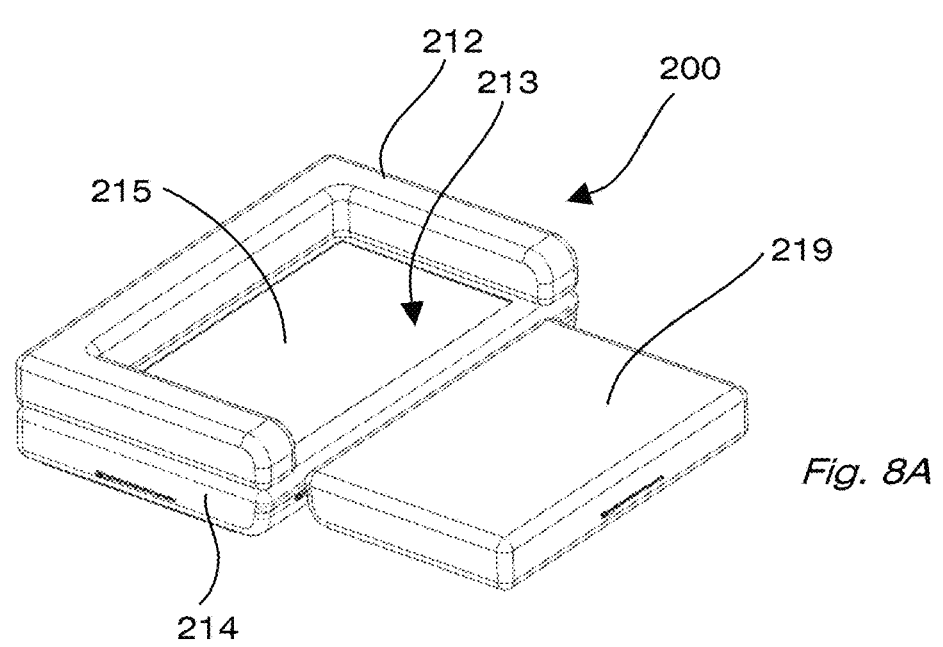
FIGS. 8A-8C are various views of the pet bed which may be selectively converted into a bathing area for pets in accordance with the present disclosure.
Figure 8B:
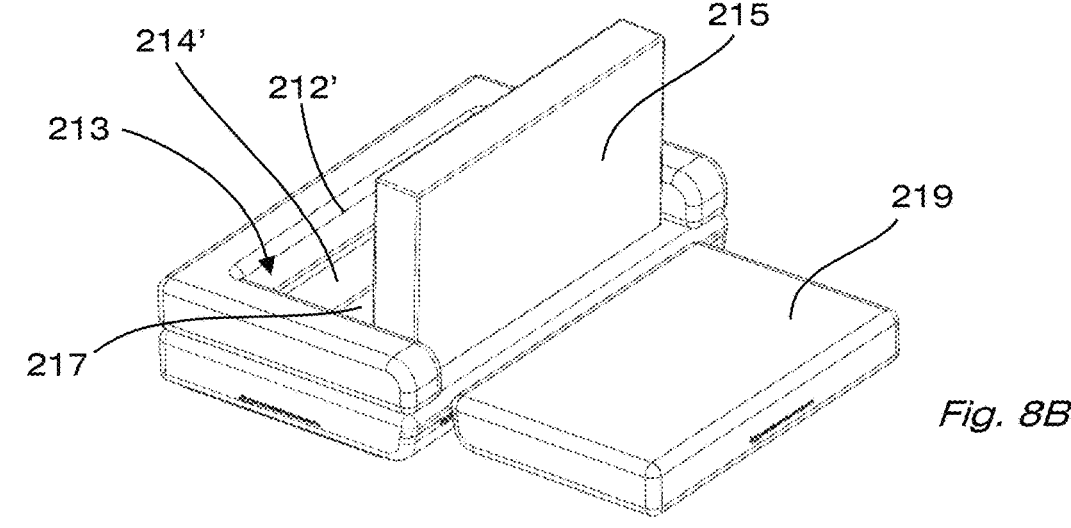
Figure 8C:
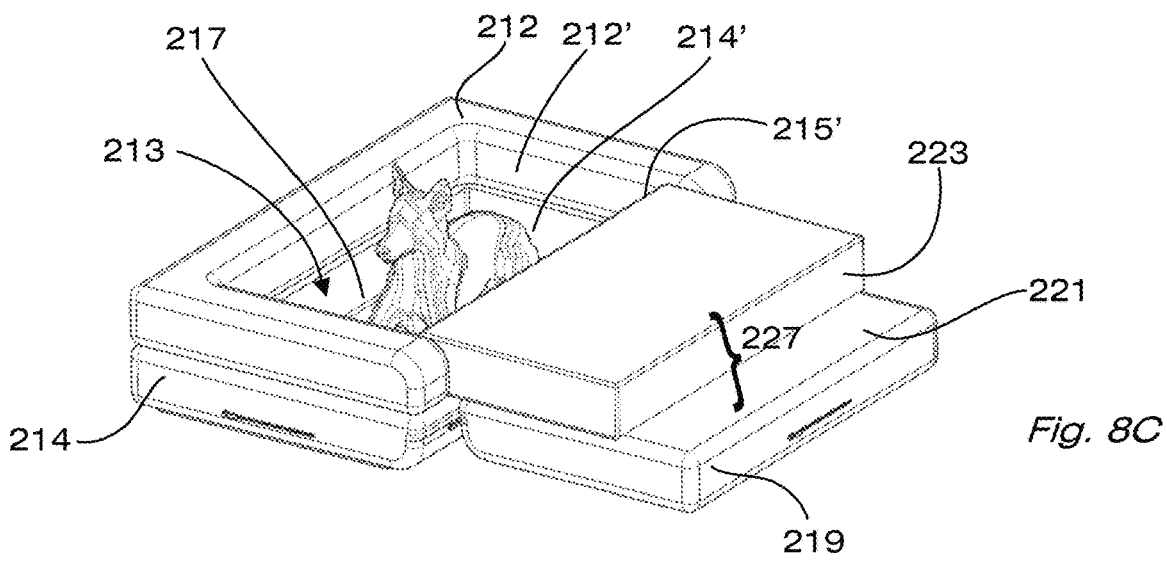

FIGS. 8A-8C show yet another embodiment of the pet bed 200 having a built-in bathing system for washing a pet. More particularly, the pet bed 200 is similar to the pet bed 10 discussed above and may include many of the above-described features shown therein, but, in this embodiment, the bottom portion 214 includes a rotating bottom pillow 215. When a user wants to convert the pet bed 200 into a bathing area, the user lifts and rotates pillow 215 to sit partially atop pillow 219 forming a step 227 (defined by side 223 and upper surface 221 of pillow 219) providing ease-of-access for the pet into a bathing area 213. Once positioned, the inner periphery 212' of the top portion 212 and the inner periphery 214' of the bottom portion 214 define the bathing area 213. The inner peripheral surfaces 212', 214' are coated, covered or made from a waterproof material as is the bottom 217 of the bathing area 213 as well as the inner facing side 215' of pillow 215 such that the bathing area 213 can retain bathing water. One or more seals (not shown) may be utilized to form a water-tight bathing area 213, e.g., the side 215' of the pillow 215 may be integrated with the bottom 217 of the bathing area 213 to ensure a water-tight junction therebetween.

In embodiments, the bathing area 213 may be made from a quick drying material or may be selectively removeable for washing purposes. For larger pets, the top portion 212 and the inner periphery 212' thereof may be selectively expandable, e.g., accordion-like, to accommodate the size of the pet. As mentioned above, any one of the modular components 80 may be utilized with pet bed 200, e.g., warming pad, vibrational pad, health or safety monitor, etc.

FIGS. 9A-9C show another embodiment of the pet bed 300 which is configured to facilitate traveling with smaller pets. More particularly, pet bed 300 includes top and bottom portions 312, 314, respectively, which fold together in a similar manner as described above and which include straps 332 for facilitating transport. Bottom portion 314 may include a pillow 319 which is selectively deployable in a similar manner to pillow 19 described above. An expandable mesh 317 is disposed between portions 312 and 314 and, when expanded, defines a containment area 327 for the pet for traveling purposes. The containment area 327 may be selectively removable to convert the pet bed 300 to a bed similar to one of the above-described pet beds 10, 200. Various types of mechanisms may be utilized to removably secure the mesh 317 to either portion 312, 314. The size of the mesh 317 and containment area 327 defined thereby may be varied in the direction "E" depending on the size of the pet and, obviously, may be limited by the ease of carrying the pet during travel. A gate 317a may be included on the side or top of the containment area 327 to facilitate access to the pet and loading of the pet for transport.

Turning to FIGS. 10A-10E, another embodiment of the pet bed 400 is shown and may include similar elements to the pet beds 10, 200, and 300 described above. Pet bed 400 may be differently shaped than the other pet beds 10, 200, and 300 shown above and includes a single portion 412 which defines a pet resting area 415 defined therein. A blanket, expandable material or protective cover 475 is operably associated with the portion 412 and is configured to cover the resting area 415 for transport (or when the pet is resting). More particularly, the blanket 475 is configured to extend over the resting area 415 and portion 412 in the direction "F" (FIG. 10C) and, optionally, secure to the portion 412 via one or more known securing mechanisms 445 (FIG. 10D), e.g., hook and loop fastener (Velcro®), zipper, snap-fit, buttons, etc. Parts of the portion 412 may be configured to additionally roll into the blanket 475 to reduce the profile of the pet bed 400 for traveling. One or more straps 432 (FIG. 10E) may be deployable from one or more pockets defined in the portion 412 (e.g., similar to pockets 45a'-45c' or 23 described above). Moreover, the pet bed 400 may be configured to include any one of the above-described accessories associated with bed 10, 200, and/or 300.

Figure 11A:
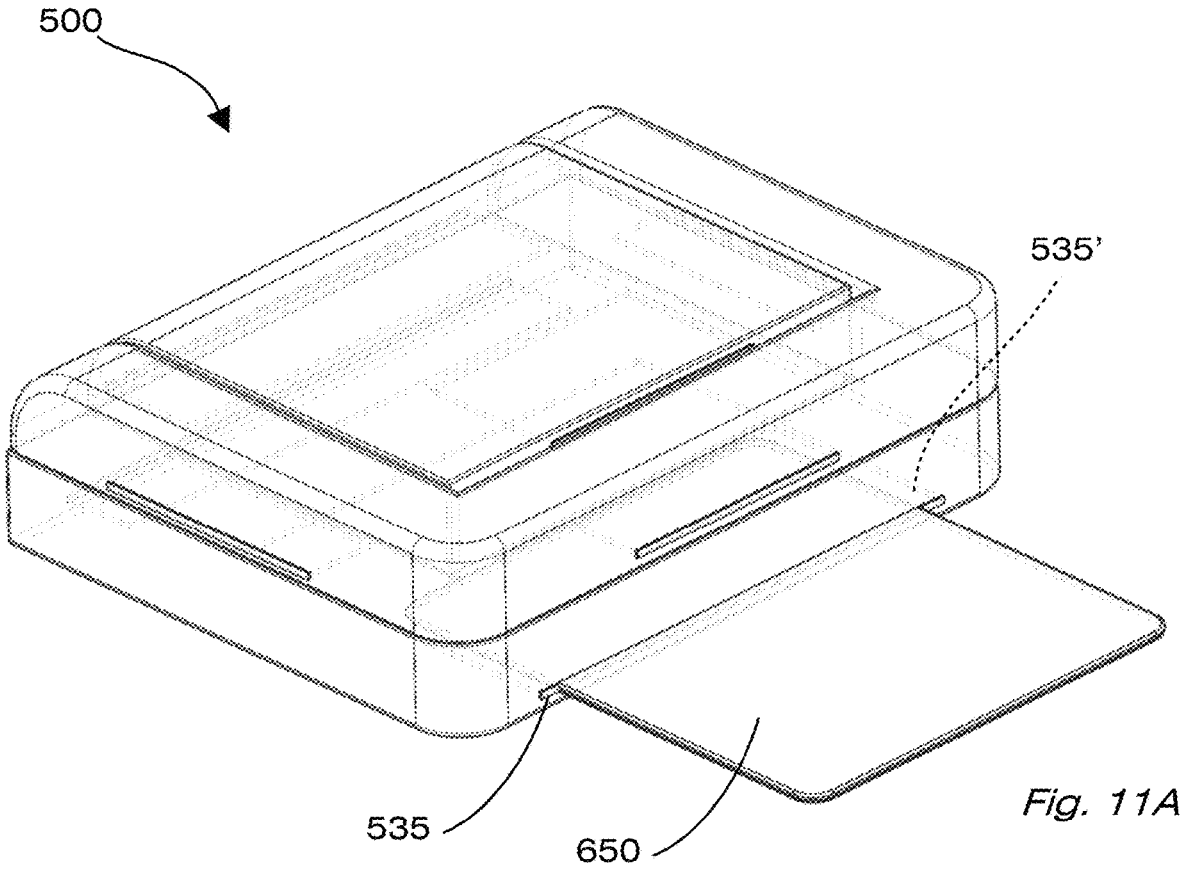
FIG. 11A is a top perspective view of another embodiment of the pet bed having a pet containment pen in a collapsed configuration for insertion therein.
Figure 11B:
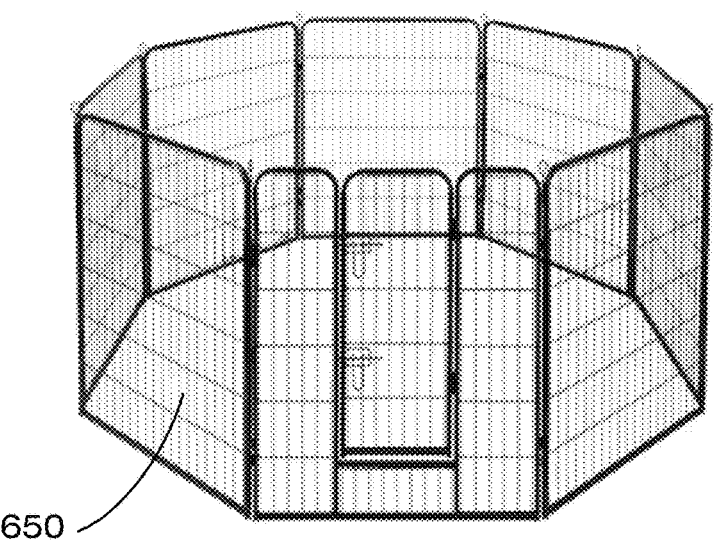
FIG. 11B is a perspective view of the pet containment pen deployed and expanded for pet containment.

FIGS. 11A and 11B show yet another embodiment of the pet bed 500 which includes a selectively removeable containment pen. As shown, pet bed 500 may be similar in shape to any of the above-identified pet beds and includes a top bed portion 512 and a lower bed portion 514. Top bed portion 512 is configured to move relative to bottom portion 14 to deploy the pet bed 500 for use. In embodiments, the entire top portion 512 or the entire bottom portion 514 may be moveable relative to one another to deploy the bed for use, i.e., extend the bed 500 for sleeping or comfort purposes. Both the top portion 512 of the bed 500 and the bottom portion 514 of the bed 500 may be configured to include one or more pockets defined therein, e.g., pocket 535', which is configured to house various pet accessories.

More particularly, pocket 535' may be configured to house a portable and collapsible pet containment pen 650. FIG. 11A shows the pet bed 500 with the pet containment pen 650 in a collapsed configuration for insertion into pocket 535'. FIG. 11B shows the pet containment pen 650 deployed and expanded for pet containment. A zipper 535 (or other closure mechanism) may be configured to secure the pet containment system 650 within the pocket 535'.

While several aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular configurations. Those skilled in the art will envision other modifications within the scope and spirit of the claims appended hereto.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended hereto.

What is claimed is:

1. A transportable pet bed, comprising:
   a top portion and a bottom portion;
   a pillow moveable relative to the top portion to expose a sleeping region for a pet, the pillow positionable relative to the top portion to expand the sleeping region;
   at least one pocket defined within the top portion or the bottom portion;
   a protective cover selectively storable within the at least one pocket and integrally attached therein, the protective cover configured to selectively deploy from the at least one pocket and fully enwrap the pet bed for both protection and transportation while remaining integrally attached with the at least one pocket; and
   a carrying strap operably coupled to at least one of the top portion or the bottom portion and configured to facilitate carrying the pet bed.

2. The transportable pet bed according to claim 1, wherein the at least one pocket is additionally configured to house and secure one or more pet accessories for transportation.

3. The transportable pet bed according to claim 1, further comprising one or more modular components integrally housed within the at least one pocket, and the one or more modular components is adapted to connect to a power or data source.

4. The transportable pet bed according to claim 3, wherein the one or more modular components integrally housed within the at least one pocket is at least one of a pet health monitor, a pet safety monitor, a warming pad, a cooling pad, a vibration pad, a music player, an alarm system, a fencing system, a leak detection system or a barking control system.

5. The transportable pet bed according to claim 3, further comprising an electrical accessory hub integrated within at least one of the top portion or the bottom portion, wherein the one or more modular components is configured to operably couple to the electrical accessory hub, the electrical accessory hub including a universal interface for operably coupling a plurality of the one or more modular components.

6. The transportable pet bed according to claim 3, wherein the pet bed includes two or more pockets for integrally housing two or more modular components, the two or more modular components configured to communicate with one another.

7. The transportable pet bed according to claim 3, wherein the one or more modular components is adapted to connect to a mobile device to enable the pet bed to be tracked via the mobile device.

8. The transportable pet bed according to claim 1, wherein the protective cover is stored within the at least one pocket under a spring bias to facilitate deployment thereof.

9. The transportable pet bed according to claim 1, wherein the carrying strap is disposed within at least one of the top portion or the bottom portion and is selectively removeable therefrom.

10. The transportable pet bed according to claim 1, wherein the carrying strap is selectively removeable from the at least one of the top portion or the bottom portion and the carrying strap is selectively convertible into a leash for securing a pet.

11. A transportable pet bed, comprising:

a top portion and a bottom portion;

a pillow moveable relative to the top portion to expose a sleeping region for a pet, the pillow positionable relative to the top portion to expand the sleeping region;

at least one pocket defined within the top portion or the bottom portion;

a protective cover selectively storable within the at least one pocket and integrally attached therein, the protective cover configured to selectively deploy from the at least one pocket and fully enwrap the pet bed for both protection and transportation while remaining integrally attached with the at least one pocket; and a food or water holder defined within and integrally associated with at least one of the top portion or the bottom portion.

12. The transportable pet bed according to claim 11, further comprising an insert configured to operably couple to the integrated food or water holder.

13. The transportable pet bed according to claim 12, wherein the insert is disposable.

14. The transportable pet bed according to claim 12, wherein the insert is reusable and configured to at least one of collapse, fold, or contract for storage within the at least one pocket.

15. The transportable pet bed according to claim 11, wherein the food or water holder is made from a material that is washable.

* * * * *